United States Patent [19]
Smith et al.

[11] Patent Number: 5,435,461
[45] Date of Patent: Jul. 25, 1995

[54] CARTRIDGE FOR DISPENSING TONER CONCENTRATE

[75] Inventors: David L. Smith, Meridian; David J. Arcaro, Boise, both of Id.

[73] Assignee: Hewlett-Packard Company, Palo Alto, Calif.

[21] Appl. No.: 285,387

[22] Filed: Aug. 3, 1994

[51] Int. Cl.6 .................. B67D 5/22; B65D 37/00; G01F 11/00
[52] U.S. Cl. ...................... 222/45; 222/209; 222/259; 222/320; 222/334; 222/340; 222/DIG. 1
[58] Field of Search .............. 222/209, 256–263, 222/214, 334, 321, 380, 385, 386, 387, 389, 325, DIG. 1, 339, 340, 320

[56] References Cited

U.S. PATENT DOCUMENTS

| | | | |
|---|---|---|---|
| 1,177,423 | 3/1916 | La Rue | 222/45 |
| 1,209,805 | 12/1916 | Boe | 222/45 |
| 1,921,118 | 8/1933 | Dayton et al. | 222/45 X |
| 3,185,345 | 5/1965 | Hunegs | 222/45 |
| 3,268,123 | 8/1966 | Spatz | 222/259 X |
| 3,870,200 | 3/1975 | Spatz | 222/206 |
| 4,154,371 | 5/1979 | Kolaczinski et al. | 222/212 |
| 4,511,068 | 4/1985 | Bossina | 222/257 |
| 4,793,522 | 12/1988 | Corsette | 222/257 |
| 4,944,430 | 7/1990 | Graf et al. | 222/259 |
| 5,253,787 | 10/1993 | Wilkinson et al. | 222/209 |

Primary Examiner—Kevin P. Shaver

[57] ABSTRACT

A cartridge for dispensing metered amounts of liquid electrophotography toner concentrate. The cartridge comprises first and second endcaps within a hollow of the cartridge for confining the concentrate; a tube rigidly attached to the first endcap having a passage therein for allowing expulsion of the concentrate when pressure is applied to the concentrate by the first endcap; and a first and second control lip rigidly attached to the tube for metering the expulsion of concentrate out through the passage. In an alternate embodiment, the first endcap is a diaphragm whereby the bowing capacity of the diaphragm meters a controlled amount of concentrate out through the passage. A pressurized medium or vacuum acts upon the first endcap to effectuate a pumping of the concentrate out through the passage for mixing with a carrier fluid.

10 Claims, 3 Drawing Sheets

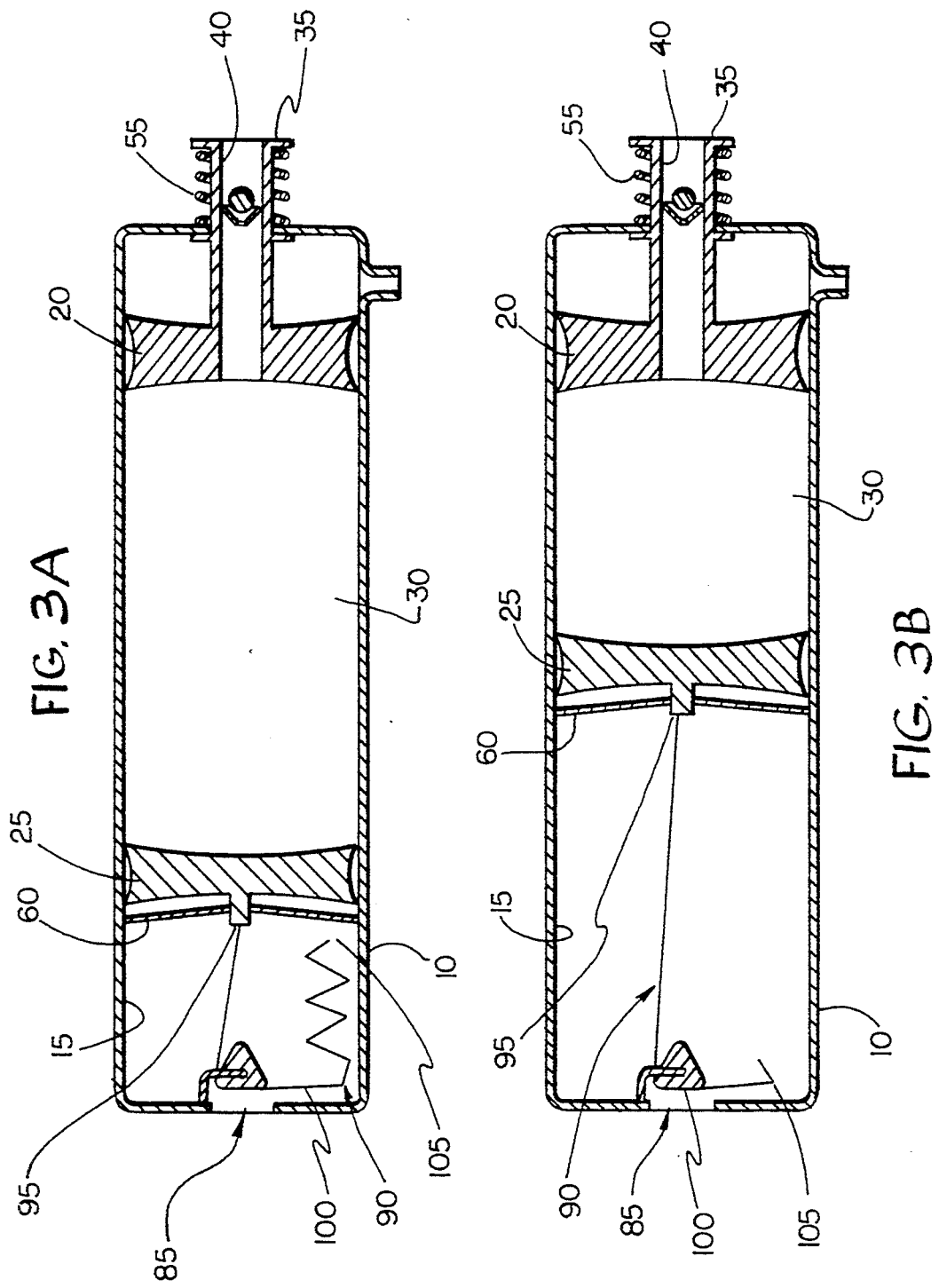

CARTRIDGE FOR DISPENSING TONER CONCENTRATE

FIELD OF THE INVENTION

This invention relates in general to liquid electrophotography (LEP) and, particular, to a cartridge for dispensing metered amounts of LEP toner concentrate.

BACKGROUND OF THE INVENTION

Laser printers and photocopier machines have traditionally used a dry-powder toner for electrostatically developing a visible image on a sheet of paper. However, in liquid electrophotography (LEP), a visible image is developed by electrostatic toners containing pigment components dispersed in an insulating carrier liquid. LEP is known to be used to produce multi-color images with liquid toners.

Given the ever increasing demand for improved printing capabilities, it is desirable to have printers and copiers that are capable of providing increased output from a toner cartridge containing the toner medium. Specifically, a toner cartridge which is capable of producing many more printed pages relative to what the typical toner cartridge produces is highly desirable.

One method of accomplishing the goal of increasing the output of an LEP toner cartridge is to use a toner concentrate. When a toner concentrate is mixed with a carrier fluid in appropriate amounts, output capabilities are increased while the dimensions of the cartridge containing the toner are decreased. Accordingly, a smaller cartridge can be used with a toner concentrate to produce output equivalent with that of traditional toner cartridges.

The problems that plague the use of toner, and especially toner concentrate, include the fact that toner is extremely messy if not properly confined. Furthermore, when using concentrate, the relatively high ratio of pigment particles in the carrier fluid creates a thicker, more pasty mixture which becomes more difficult to remove or pump out of the cartridge. Moreover, when mixing an LEP toner concentrate with a carrier fluid, exact, metered amounts must be mixed to produce appropriate ratios of pigment particles in the carrier fluid to avoid flow and image problems associated with the electrophotographic process and incorrect mixture ratios.

Given the continuous effort in the computing and printing industries to increase output, shrink dimensions, and create simpler, easier to use, and cheaper products, the foregoing problems associated with using LEP toner concentrate present challenges to be overcome. Accordingly, objects of the present invention are to provide an improved cartridge for dispensing LEP toner concentrate with precise metering capabilities for mixing the concentrate with a carrier fluid. Further objects are to provide a cartridge that is easy to use, mechanically simple, inexpensive, and leak-free.

SUMMARY OF THE INVENTION

According to principles of the present invention in its preferred embodiment, a cartridge for dispensing liquid electrophotography toner concentrate is disclosed. A containment means, including first and second endcaps, defines a first chamber for confining the toner concentrate within a hollow of the cartridge. A transfer means having a passage therein communicates between the first chamber and an exterior of the cartridge for allowing expulsion of the concentrate when pressure is applied to the concentrate via the endcaps. A control means communicates with the first endcap for precisely metering the expulsion of concentrate out through the transfer means. As disclosed, the invention is capable of pumping precisely metered amounts of toner concentrate while retaining mechanical simplicity and secured containment of the concentrate.

According to further principles of the present invention, the transfer means is rigidly attached to the first endcap, and both are bi-directionally slidably disposed within the hollow. The first endcap and transfer means slide from a first position to a second position as metered by the control means in a direction toward the concentrate upon receiving a force applied thereto, and the second endcap remains substantially stationary, thus expelling concentrate out through the passage.

According to further principles of the present invention, a bias means communicates with the first endcap and transfer means for retracting the first endcap from its second position back to its first position; and, whereupon, the second endcap respondingly slides from a first position to a second position in a direction toward the concentrate to retain a substantially equalized pressure within the first chamber.

According to further principles of the present invention, the control means includes a first and second lip protruding from the transfer means; and wherein the first lip, in conjunction with the bias means, retains the first endcap in its first position, and the second lip, in conjunction with the force applied, retains the first endcap in its second position.

According to further principles of the present invention, the containment means defines a second chamber apart from the first chamber; the second chamber communicating with an aperture in the cartridge for receiving the force applied to the first endcap and transfer means.

The aforementioned principles of the present invention provide an improved cartridge for dispensing LEP toner concentrate with significantly improved metering capabilities for mixing the concentrate with a carrier fluid. Moreover, the cartridge is easy to use, mechanically simple, inexpensive, and substantially leak-free. Other objects, advantages, and capabilities of the present invention will become more apparent as the description proceeds.

DESCRIPTION OF THE DRAWINGS

FIGS. 3A–B depict a cross-sectional, side elevation view of a second alternate embodiment of the invention employing a gauge means for detecting the amount of concentrate in the cartridge.

DETAILED DESCRIPTION OF THE INVENTION

Figure 1:
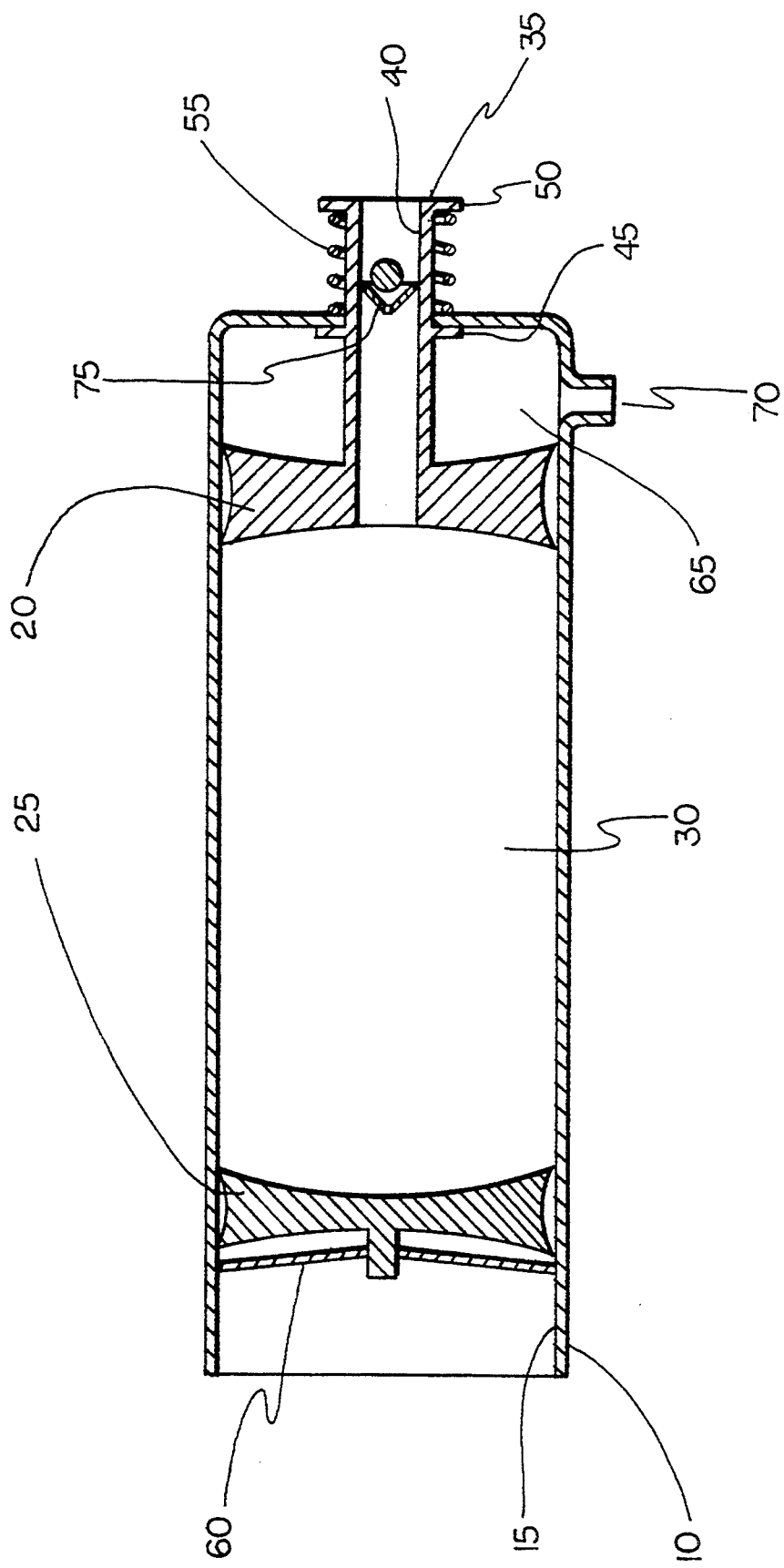
FIG. 1 is a cross-sectional, side elevation view of the preferred embodiment of the-present invention cartridge for toner concentrate.

FIG. 1 is a cross-sectional, side elevation view of the preferred embodiment of the present invention cartridge for toner concentrate. Cartridge 10 includes hollow 15 and first and second endcap containment means 20 and 25 disposed within hollow 15. First and second endcaps 20 and 25 define first chamber 30 within hollow 15 for confining a toner concentrate (not depicted). First and second endcaps 20 and 25 seal first chamber 30 to avoid leakage of a concentrate contained therein.

Transfer means 35 is a tube which includes passage 40 communicating between first chamber 30 and an exterior of the cartridge for allowing expulsion of the concentrate when pressure is applied to the concentrate by containment means 20 and 25. Transfer means 35 is rigidly coupled to first endcap 20.

First endcap 20 and transfer means 35 are bi-directionally slidably disposed within hollow 15 and slide from a first position to a second position (not shown) as metered by first and second lip control means 45 and 50 in a direction toward the concentrate upon receiving a force applied thereto. Second endcap 25 is unidirectionally slidably disposed within hollow 15 so as to slide only in a direction toward first endcap 20. Washer 60 provides a means for second endcap to slide unidirectionally toward first endcap 20. Accordingly, second endcap 25 remains substantially stationary as first endcap 20 slides toward it to expel the concentrate from within first chamber 30 out through passage 40. However, when first endcap 20 retracts from its second position to its first position, second endcap 25 respondingly slides from its first position to its second position in a direction toward first endcap 20 to retain a substantially equalized pressure within the first chamber.

Bias means 55 and first lip 45, in contact with cartridge 10, retain first endcap 20 and transfer means 35 in their first position until a force is applied to first endcap 20 or transfer means 35 sufficient to overcome spring bias means 55. When a sufficient force is applied in a direction toward second endcap 25, first endcap 20 and transfer means 35 slide toward second endcap 25 until second lip 50 stops the movement by coming in contact with cartridge 10. Likewise, when the force ceases to be sufficient to overcome spring 55, the spring will retract first endcap 20 and transfer means 35 back from the second position to the first position.

In essence, first endcap 20 and transfer means 35 act as a piston which moves back and forth to pump concentrate from first chamber 30 out through passage 40 in precise amounts as controlled by first and second lip 45 and 50. Respondingly, second endcap 25 incremental slides toward first endcap 20 to retain a substantially equalized pressure within first chamber 30; each time first endcap 20 retracts back to its first position from its second position.

Also in its preferred embodiment, second chamber 65 is defined apart from first chamber 30 by first endcap 20 being disposed within hollow 15 of cartridge 10. Second chamber 65 communicates with aperture 70 of cartridge 10 for receiving the force applied to first endcap 20. Preferably, the force is a pressurized medium such as compressed air which enters aperture 70 and forces first endcap 20 to move from its first position (depicted) toward second endcap 25 into its second position (not depicted), thus causing concentrate to be expelled out through passage 40. Although a pressurized force is preferred, it is apparent that other forces applied to first endcap 20 and/or transfer means 35 will likewise suffice, such as any known mechanical means.

Check valve 75 ensures that concentrate transfers through passage 40 unidirectionally, i.e., out from first chamber 30. Check valve 75 can be any one-way valve known in the art that is suitable for the purposes described and depicted. Likewise, spring 55 can be any bias means known in the art that is suitable for the purposes described and depicted.

To summarize the mechanical workings of the present invention as depicted in FIG. 1:

1) a pressurized medium is introduced into aperture 70;
2) first endcap 20 and transfer means 35 are forced back from their first position toward second endcap 25 into a second position, as metered by second lip control means 50;
3) spring bias means 55 is compressed;
4) washer 60 prevents second endcap 25 from moving back with first endcap 20;
5) a specific amount of concentrate is expelled out of first chamber 30 through passage 40 and check valve 75;
6) the pressurized medium lessens in force and spring bias means 55 retracts first endcap 20 and transfer means 35 back to their first position, as metered by first lip control means 45;
7) check valve 75 prevents concentrate from being sucked back into first chamber 30;
8) second endcap 25 slides forward toward first endcap 20 to substantially equalize the pressure in first chamber 30.

Although not depicted, once the concentrate is expelled through passage 40 it is mixed in appropriate amounts with a liquid carrier fluid separate from the present invention cartridge. Alternatively, mixing could obviously occur in a separately defined chamber of the present invention cartridge in another alternate embodiment.

As depicted and described, the present invention provides a preferred embodiment for self-metered pumping of LEP toner concentrate. Advantageously, the amount of concentrate pumped does not depend upon the length of time a force is applied or upon how much force is applied, so long as the force is sufficient to overcome the resistance of the bias means. Furthermore, the design is inexpensive and mechanically simple providing few parts, no critical tolerances, and minimal potential for leakage.

Figure 2:
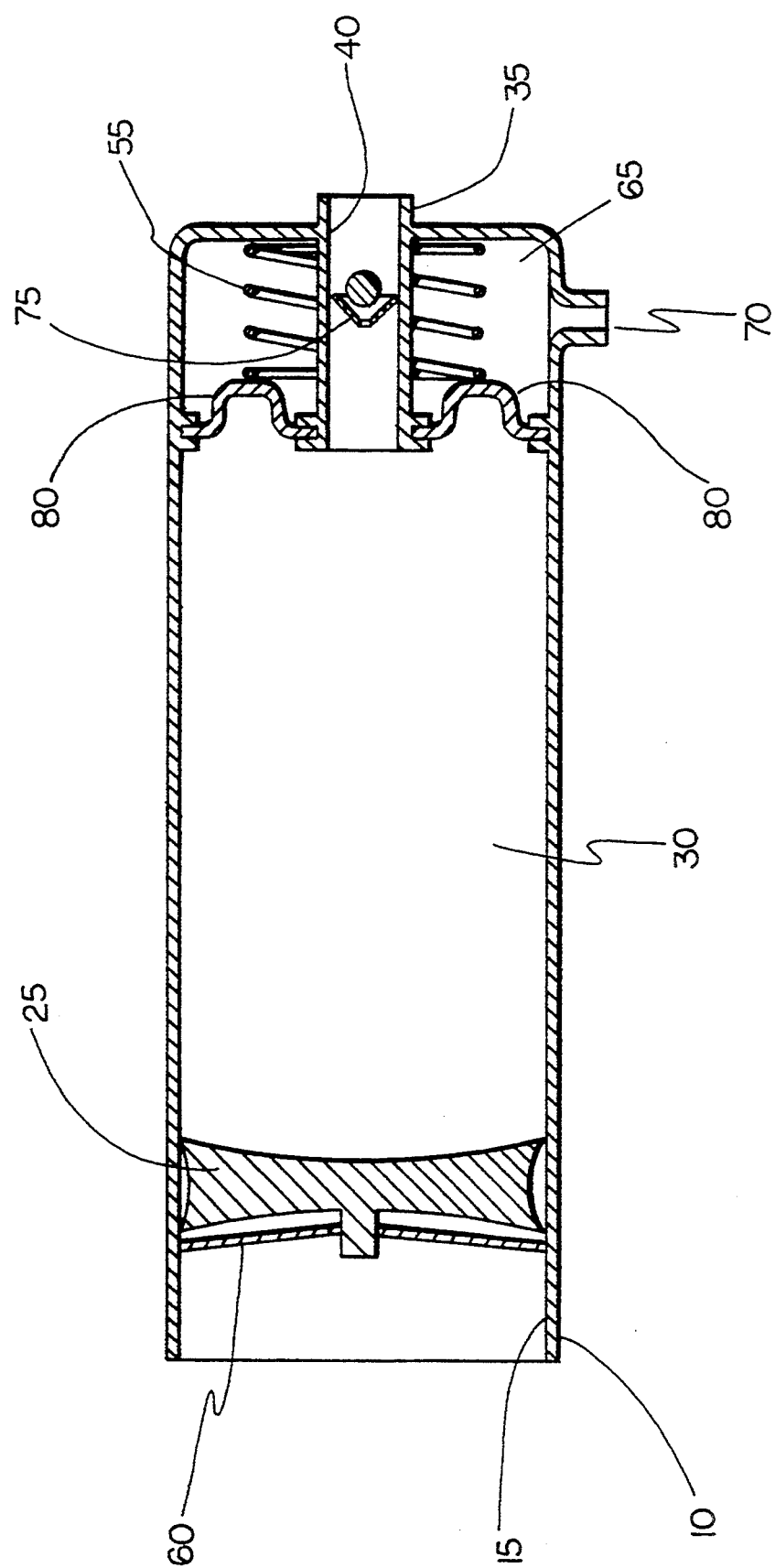
FIGS. 2 depicts a cross-sectional, side elevation view of an alternate embodiment of the invention employing a diaphragm for pumping the concentrate.

Referring now to FIG. 2, an alternate embodiment of the invention is depicted in a cross-sectional, side elevation view. In this embodiment, flexible diaphragm 80 acts as first endcap 20 of FIG. 1, and spring bias means 55 is coupled between diaphragm 80 and an inner wall of hollow 15. Otherwise, all other components and the means for working the cartridge remain the same.

When diaphragm 80 receives a force in a direction toward second endcap 25, it bows from its first position (depicted) to a second position (not depicted) in a direction toward second endcap 25 to pump the concentrate through passage 40. Similar to the embodiment of FIG. 1, when the force decreases, spring means 55 retracts the diaphragm to its first position and second endcap 25 respondingly slides toward first endcap 80 to substantially stabilize the pressure in first chamber 30.

Although spring means 55 is depicted here, it is obvious that diaphragm 80 could alternatively be a substantially self-bowing diaphragm. Namely, the diaphragm remains in its first position (as depicted) without the need for any bias means. Then, when a force acts upon it, it bows to its second position to pump the concentrate. Subsequently, when the forces cease or decrease sufficiently, the diaphragm automatically bows back to its first position because of its self-bowing structure and composition.

Likewise, although not depicted, instead of using compressed air, a vacuum is usable as the force to pump the concentrate by simply reversing the bow of diaphragm 80. Namely, the first position of the bow of the diaphragm would be opposite that currently depicted. Consequently, when the vacuum is applied through aperture 70, diaphragm 80 bows to its second position in a direction away from second endcap 25 to pump the concentrate.

Referring now to FIGS. 3A-B, a cross-sectional, side elevation view of a second alternate embodiment of the invention is depicted. This embodiment portrays the same embodiment as described in FIG. 1 but includes a gauge means whereby a visible determination of the amount of concentrate remaining in first chamber 30 of cartridge 10 can be made. The gauge means comprises gauge window aperture 85 in cartridge 10, and gauge tape 90 having first end 95 coupled to second endcap 25, tape body 100 visible through gauge window 85, and second end 105 disposed in hollow 15.

As second endcap 25 slides toward first endcap 20 (each time concentrate is expelled through passage 40) gauge tape 90 is pulled along such that varied portions of the tape become displayed through gauge window 85. The varied portions are marked according to the respective amount of concentrate remaining in first chamber 30.

Although not depicted, it is obvious that other means for gauging the amount of concentrate in first chamber 30 could likewise be used. For example, the tape could be on a roller instead of folded in the cartridge, or a variable resistor could sense the position of the sliding endcap and feed the data back appropriately.

What has been described above are the preferred embodiments for a cartridge for dispensing LEP toner concentrate. It is clear that the present invention provides a powerful tool for significantly improving the means for accurately metering toner concentrate to be mixed with a carrier fluid. While the present invention has been described by reference to specific embodiments, it will be apparent that other alternative embodiments and methods of implementation or modification may be employed without departing from the true spirit and scope of the invention.

What is claimed is:

1. A cartridge for dispensing liquid electrophotography toner concentrate, comprising:
    a) containment means including first and second endcaps disposed within a hollow of the cartridge defining a first chamber for confining the concentrate and a second chamber adjacent the first endcap for receiving a force applied to the first endcap, wherein the second chamber communicates with an aperture in the cartridge, and wherein the second endcap is unidirectionally slidably disposed within the hollow;
    b) transfer means rigidly coupled to the first endcap, the transfer means having a passage therein communicating between the first chamber and an exterior of the cartridge for allowing expulsion of the concentrate when pressure is applied to the concentrate by the containment means; and
    c) control means communicating with the containment means for metering the expulsion of concentrate out through the transfer means; and
wherein the first endcap is bi-directionally slidably disposed within the hollow and slides from a first position to a second position as metered by the control means upon receiving the force applied thereto, thus expelling concentrate out through the passage, and wherein the force is selected from the group consisting of a pressurized medium and a vacuum.

2. The cartridge of claim 1 further including gauge means communicating with the containment means for indicating an amount of concentrated confined in the first chamber.

3. The cartridge of claim 2 wherein the gauge means includes a gauge window aperture defined in a wall of the cartridge, and a graduated tape having a first and second end and a body, and wherein the first end is attached to the second endcap and a portion of the body extends adjacent the gauge window.

4. The cartridge of claim 1 further including bias means communicating between the cartridge and the transfer means for retracting the first endcap from its second position back to its first position as metered by the control means, and whereupon the second endcap respondingly slides from a first position to a second position in a direction toward the first chamber to retain a substantially equalized pressure within the first chamber.

5. The cartridge of claim 4 wherein the control means includes a first and second lip protruding from the transfer means and wherein:
    a) the first lip, in conjunction with the bias means, retains the first endcap in its first position; and
    b) the second lip, in conjunction with the force applied, retains the first endcap in its second position.

6. The cartridge of claim 5 wherein the bias means communicates between the cartridge and the first endcap.

7. The cartridge of claim 6 wherein the bias means is a spring.

8. A cartridge for dispensing liquid electrophotography toner concentrate, comprising:
    a) containment means including first and second endcaps disposed within a hollow of the cartridge defining a first chamber for confining the concentrate and a second chamber adjacent the first endcap for receiving a force applied to the first endcap, wherein the second chamber communicates with an aperture in the cartridge, wherein the first endcap is a substantially flexible diaphragm rigidly coupled to the hollow of the cartridge at a periphery of the diaphragm, and wherein the second endcap is unidirectionally slidably disposed within the hollow;
    b) transfer means rigidly coupled to the first endcap, the transfer means having a passage therein communicating between the first chamber and an exterior of the cartridge for allowing expulsion of the concentrate when pressure is applied to the concentrate by the containment means; and
    c) control means communicating with the containment means for metering the expulsion of concentrate out through the transfer means; and
wherein the first endcap flexes from a first position to a second position as metered by the control means upon receiving the force applied thereto, thus expelling concentrate out through the passage, and wherein the force is selected from the group consisting of a pressurized medium and a vacuum.

9. The cartridge of claim 8 further including bias means communicating with the diaphragm for retracting the diaphragm from its second position to its first position.

10. The cartridge of claim 8 wherein the control means is a bowing capacity of the diaphragm.

* * * * *